United States Patent [19]

Nerstrom

[11] Patent Number: 4,660,514
[45] Date of Patent: Apr. 28, 1987

[54] TWO-CYCLE INTERNAL COMBUSTION ENGINE INCLUDING MEANS FOR VARYING CYLINDER PORT TIMING

[75] Inventor: James S. Nerstrom, Gurnee, Ill.

[73] Assignee: Outboard Marine Corporation, Waukegan, Ill.

[21] Appl. No.: 715,479

[22] Filed: Mar. 25, 1985

Related U.S. Application Data

[62] Division of Ser. No. 376,705, May 10, 1982, Pat. No. 4,516,540, which is a division of Ser. No. 141,906, Apr. 21, 1980, Pat. No. 4,341,188.

[51] Int. Cl.⁴ .................................................. F02B 75/02
[52] U.S. Cl. ............................. 123/65 PE; 123/65 V; 123/73 R
[58] Field of Search ............... 123/65 PE, 65 A, 323, 123/73 R, 188 B, 65 R

[56] References Cited

U.S. PATENT DOCUMENTS

| 1,096,261 | 5/1914 | Murphy | 123/188 B |
|---|---|---|---|
| 1,101,374 | 6/1919 | Woolery | 123/73 SP |
| 1,514,476 | 11/1924 | Still | 123/65 V |
| 1,743,558 | 1/1930 | McCabe | 123/65 V |
| 1,762,214 | 6/1930 | Carwright | 123/65 WA |
| 1,912,574 | 6/1933 | Ewing | 123/65 V |
| 2,189,106 | 2/1940 | Garve et al. | 123/65 V |
| 2,714,879 | 8/1955 | Meulien et al. | 123/65 V |
| 3,817,227 | 2/1940 | Onishi | 123/73 |
| 4,121,552 | 10/1978 | Mithuo et al. | 123/65 V |
| 4,202,297 | 5/1980 | Oku et al. | 123/65 PE |
| 4,321,893 | 3/1982 | Yamamoto | 123/65 V |

FOREIGN PATENT DOCUMENTS

| 860603 | 3/1952 | Fed. Rep. of Germany . |
|---|---|---|
| 372962 | 12/1952 | Fed. Rep. of Germany . |
| 959963 | 3/1957 | Fed. Rep. of Germany . |

Primary Examiner—E. Rollins Cross
Attorney, Agent, or Firm—Michael, Best & Friedrich

[57] ABSTRACT

The two-cycle internal combustion engine includes an engine block having a cylindrical wall defining a cylinder having a head end, a piston mounted for reciprocative movement in the cylinder, and a passage in the engine block, such as an exhaust passage, a transfer passage, or a crankcase fuel intake passage, terminating at the cylinder wall in a port, such as an exhaust port, a transfer port or a piston-controlled, crankcase fuel intake port, having upper and lower edges. A valve mounted in the passage for movement relative to the port is operable to selectively vary the effective distance of one of the port edges from the cylinder head end and thereby provide the capability of varying the timing of the port opening and/or closing as required to obtain optimum engine performance at different operating conditions.

4 Claims, 12 Drawing Figures

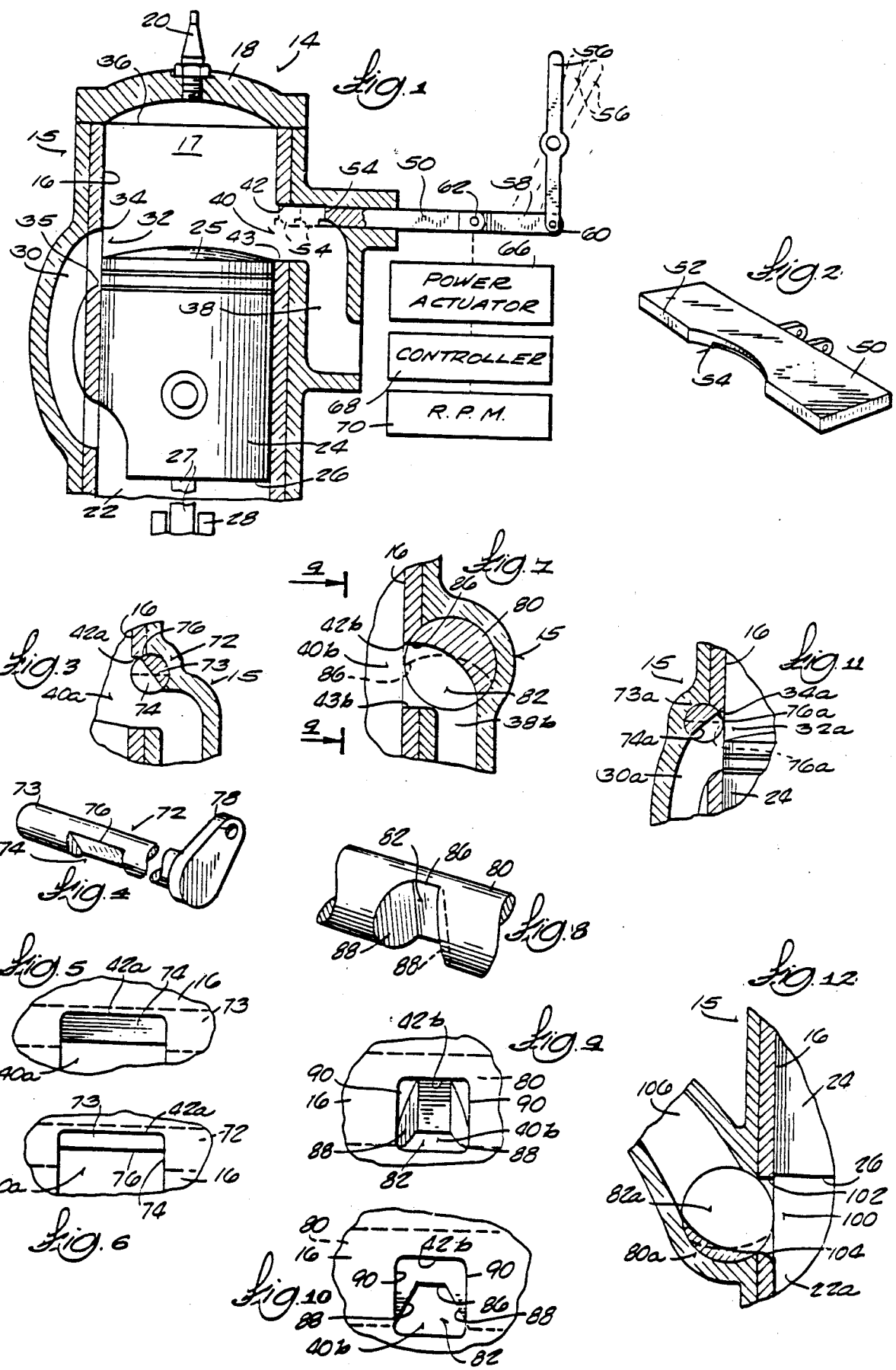

TWO-CYCLE INTERNAL COMBUSTION ENGINE INCLUDING MEANS FOR VARYING CYLINDER PORT TIMING

This is a divisional of application Ser. No. 376,705 filed May 10, 1982, now U.S. Pat. No. 4,516,540 which, in turn, is a division of application Ser. No. 141,906, filed Apr. 21, 1980, now U.S. Pat. No. 4,341,188.

FIELD OF THE INVENTION

This invention relates to two-cycle internal combustion engines and, more particularly, to means for varying the timing of the opening or closing of various ports in the engine cylinder, such as an exhaust port, a fuel intake port and a transfer port.

BACKGROUND—PRIOR ART

For optimum performance of two-cycle internal combustion engines under different load or operating conditions, it is desirable to vary the timing for opening and/or closing the exhaust, transfer or fuel intake ports depending upon the operating conditions. For instance, it is desirable to open the exhaust port later during the expansion stroke of the piston for maximum power and fuel efficiency at lower engine speeds and to open the exhaust port earlier during the expansion stroke when the engine is operating under lower load, higher speed conditions. Variations of the timing of transfer port opening is desirable under certain operating conditions for optimization of power and fuel economy. For two-cycle engines having a fuel intake port controlled by the piston, early opening of the intake port is more desirable for high speed power, whereas later opening of the intake port is more desirable for lower speeds.

Examples of prior art constructions for varying the timing of the opening and/or closing of various ports in the cylinder a two-cycle internal combustion engine are disclosed in the Still U.S. Pat. No. 1,514,476 issued Nov. 4, 1924 and the Meulien U.S. Pat. No. 2,714,879 issued Aug. 9, 1955.

Examples of prior art constructions for two-cycle internal combustion engines including a valve in an exhaust, a fuel intake passage or, a transfer passage for controlling flow from or into the engine cylinder are disclosed in the following U.S. patents:

| PATENTEE | PAT. NO. | ISSUE DATE |
| --- | --- | --- |
| Woolerg | 1,101,374 | June 23, 1914 |
| McCabe | 1,743,558 | January 14, 1930 |
| Ewing | 1,912,574 | June 6, 1933 |
| Garve | 2,189,106 | February 6, 1940 |
| Onishi | 3,817,227 | June 18, 1974 |

SUMMARY OF THE INVENTION

The invention provides a two-cycle internal combustion engine including an engine block having a cylindrical wall defining a cylinder having a head end, a piston mounted for reciprocative movement in the cylinder, a passage in the engine block terminating at the cylinder wall in a port having upper and lower edges, and valve means mounted in the passage for varying the effective distance of one of the port edges from the cylinder head end.

The valve means can be mounted in the engine block to vary the effective distance of the upper edge of an exhaust port or a transfer port from the cylinder head end or to vary the effective distance of the lower edge of a piston-controlled fuel intake port from the cylinder head end.

In one embodiment, the valve means includes a valve member having an edge portion and mounted for radially reciprocative movement relative to the cylinder wall and to the port between a first position when the valve member edge portion is spaced radially outwardly from the cylindrical wall and does not substantially affect the effective distance of the port edge from the cylinder head end and a second position wherein the valve member edge portion is located adjacent the cylinder wall and the port and acts as an edge of the port to effectively change the distance thereof from the cylinder head end.

In another embodiment, the valve means comprises a rotary valve member including an elongated barrel section and an axially extending notch in the barrel section having an edge and a length substantially coextensive with the width of the port. The barrel section is mounted transversely of the engine passage and adjacent to the port for rotational movement between a first position wherein the notch is located relative to the port so as not to substantially affect the effective distance of the port edge from the cylinder head end and a second position wherein a portion of the barrel section extends past the port edge and the notch edge effectively acts on one edge of the port.

In a further embodiment, the valve means comprises a valve member including an elongated barrel section and a passageway in the barrel section for registering with the engine port and the engine passage and having an inlet which has a transverse edge, side edges and a shape different from that of the port. The barrel section is mounted transversely of the passage and adjacent the port for rotational movement between a first position wherein the passageway inlet does not substantially affect the effective distance the one edge of the port from the cylinder head end or the effective opening area of the port and second position wherein the transverse edge and the side edges of the passageway inlet extend inwardly from the respective edges of the port to define a smaller opening, with the transverse edge of the passageway inlet effectively acting as the upper or lower edge of the port.

One of the principal features of the invention is the provision of a two-cycle internal combustion engine including a simple means for selectively varying the timing of the opening or closing of a port in the engine cylinder, such as an exhaust port, a transfer port, or a fuel intake port, to optimize engine performance under different operating conditions.

Another of the principal features of the invention is the provision of a two-cycle internal combustion engine including a passage terminating at the cylinder wall in a port having upper and lower edges and a valve mounted in the passage for movement relative to the port to vary the effective distance of one of the port edges from the cylinder head end.

Another of the principal features of the invention is the provision of such a two-cycle internal combustion engine wherein the valve is arranged to also vary the effective area of the port.

Other features and aspects of the invention will become apparent to those skilled in the art upon reviewing the following description, drawings and appended claims.

BRIEF DESCRIPTION OF THE DRAWINGS

FIG. 1 is a fragmentary, partially schematic, sectional view of one embodiment of a two-cycle internal combustion engine incorporating various of the features of the invention, shown with the piston near bottom dead center.

FIG. 2 is a perspective view of the exhaust port control valve of the engine illustrated in FIG. 1.

FIG. 3 is a fragmentary, sectional view of an alternate embodiment of a valving arrangement for controlling the timing of exhaust port opening.

FIG. 4 is a perspective, partially broken view of the exhaust port control valve of the embodiment illustrated in FIG. 3.

FIGS. 5 and 6 are diagrammatic representations of the effective exhaust port opening when the exhaust port control valve in the engine of FIG. 3 is in the high port and low port positions, respectively.

FIG. 7 is a fragmentary, sectional view of an alternate embodiment of the valving arrangement for controlling the timing of exhaust port opening.

FIG. 8 is a fragmentary, perspective view of the exhaust port control valve in the embodiment illustrated in FIG. 7.

FIGS. 9 and 10 are diagrammatic representations of the effective exhaust port opening when the exhaust port control valve of the engine illustrated in FIG. 7 is in the high and low port positions, respectively.

FIG. 11 is a fragmentary, sectional view of another alternate embodiment including a valving arrangement for controlling the timing of the transfer port opening.

FIG. 12 is a fragmentary, sectional view of another alternate embodiment including a valving arrangement for controlling the timing of fuel intake port opening.

Before explaining at least one embodiment of the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Illustrated in FIGS. 1 and 2 is a two-cycle internal combustion engine 14 including a block 15 defining a cylinder 16 having a combustion chamber 17 and a cylinder head 18 which has a threaded aperture for receiving a spark plug 20. The engine 10 further includes a crankcase 22 extending from the combustion chamber 16.

Mounted for reciprocative movement inside the cylinder 16 is a piston 24 having upper and lower edges 25 and 26 and connected, via a connecting rod 27, to a crankshaft 28 extending through the crankcase 22. Reciprocative movement of the piston 24 cyclically produces relatively high and low pressure conditions in the crankcase 22 in the usual manner with maximum and minimum crankcase pressure existing when the piston 24 is at bottom dead center and top dead center, respectively.

A fuel-air mixture is introduced into the crankcase 22 in response to variations in the crankcase pressure in any known manner. The crankcase 22 is connected in communication with the combustion chamber 16 by one or more transfer passages 30 (one shown) extending in the engine block 15. Each transfer passage 30 terminates at the cylinder wall in a transfer port 32 having upper and lower edges 34 and 35 located at predetermined distances from the head end 36 of the cylinder 16. A charge of the fuel-air mixture, flowing from the crankcase 22 through the transfer passage 30, is introduced into the combustion chamber 17 as the upper edge 25 of the piston 24 uncovers the transfer port 32 during travel from top dead center toward bottom dead center.

The engine block 15 also includes one or more exhaust passages 38 (one shown), each terminating at the cylinder wall in an exhaust port 40 having upper and lower edges 42 and 43 located at predetermined distances from the cylinder head end 36. Combustion products or exhaust gases are exhausted from the combustion chamber 17 and discharged through the exhaust passsage 38 as the upper edge 25 of the piston 24 uncovers the exhaust port 40 during travel from top dead center toward bottom dead center.

The upper edges 34 and 42 of the transfer port 34 and the exhaust port 40 preferably are located relative to the cylinder head end 36 and relative to each other to provide exhaust port opening relative to transfer port opening which produces the most efficient engine performance at high speed, low load conditions. At lower speed, higher load conditions, later exhaust port opening relative to transfer port opening usually produces a more efficient engine performance.

Movably mounted in the exhaust passage 38 adjacent the exhaust port 40 is a valving or flow adjusting arrangement arranged to vary the effective distance of the upper edge 42 of the exhaust port 40 from the cylinder head end 36 and thereby vary the timing of the exhaust port opening relative to the transfer port opening. While various valving arrangements can be used, in the specific construction illustrated in FIGS. 1 and 2, the valving arrangement includes a plate-like valve member 50 having an inner end 52 including an arcuate edge portion 54 which has a concave contour corresponding to that of the cylinder wall. The valve member 50 is mounted in the engine block 12 for radially reciprocative movement relative to the cylinder wall and to the exhaust port 40 between a first or high port position (illustrated by solid lines in FIG. 1) and a second or low port position (illustrated by dashed lines in FIG. 1).

When the valve member 50 is in the high port position, the edge portion 54 is spaced radially outwardly from the exhaust port 40 and has no substantial effect on the distance of the upper edge 42 of the exhaust port 40 from the cylinder head end 36, and thus, no substantial effect on the timing of exhaust port opening. When the valve member 50 is in the low port position, the edge portion 54 is located adjacent the cylinder wall and effectively acts as the upper edge of the exhaust port 40. That is, the upper edge of the exhaust port 40 is effectively lowered, resulting in the exhaust port 40 opening later as the piston 24 travels toward bottom dead center.

When the valve member 50 is located at positions intermediate the high and low port positions, the edge portion 54 effectively acts as the upper edge of the exhaust port 40, at a decreasing distance from the cylinder head in 36 as the valve member 50 is moved fom the low port position toward the high port position. The edge portion 54 preferably is chamfered as illustrated in FIGS. 1 and 2.

Means are provided for selectively moving the valve member between the high port and low port positions.

In the specific construction illustrated by solid lines in FIG. 1, such means includes a pivotally mounted hand lever 56 connected to the valve member 50 via a link 58 having one end pivotally mounted at 60 on the hand lever 56 and the opposite end pivotally mounted at 62 on the valve member 50. The operator can change the timing of exhaust port opening, as required to optimize engine performance for different operating conditions, by moving the hand lever 56 in the appropriate direction. For example, if the engine is being used in a marine propulsion device for a racing boat, the driver can move the hand lever clockwise from the solid position illustrated to effect a low exhaust port condition which is more desirable for engine idling or prior to achieving planing of the boat when maximum power is required at low engine speeds. After the boat is planing, the driver can move the hand lever 56 counterclockwise to effect a higher exhaust port condition, which is more desirable for higher speed, lower load conditions If desired, means can be provided for automatically moving the valve member 50 in response to a variable engine operating parameter to obtain optimum exhaust port position for different engine operating conditions. For instance, as illustrated diagrammatically by the dashed lines in FIG. 1, such means can include a power actuator 66, such an electric or hydraulic driven reciprocative member for operating the valve member 50, and a controller 68 which receives a signal from a device 70 measuring engine speed and produces a signal for operating the power actuator 66 in response to variations in engine speed.

In the alternate construction illustrated in FIGS. 3-6, the valving arrangement for controlling the timing of exhaust port opening comprises a rotary valve member 72 including an elongated barrel section 73 having an axially extending notch 74 which has an edge 76 and a length substantially coextensive with the width of the exhaust port 40a. The barrel section 73 extends transversely of the exhaust passage 38a and is mounted in the engine block 15 adjacent the upper edge 42a of the exhaust port 40a for rotational movement between a first or high port position and a second or lower power position.

When the barrel section 33 is in the high port position (illustrated diagrammatically in FIG. 5 and by solid lines in FIG. 3), the notch 74 is situated with respect to the exhaust port 40a such that the notch edge 76 does not substantially affect the effective distance of the upper edge 42a of the exhaust port 40a from the cylinder head in 36. When the barrel section 73 is in the low port position (as illustrated diagrammatically in FIG. 6 and by dashed lines in FIG. 3), a portion of the barrel section 73 extends past the upper edge 42a of the exhaust port 40a and the notch edge 76 effectively acts as a lower upper edge of the exhaust port 40a.

When the barrel section 73 is located at positions intermediate the high and low port positions, the notch edge 76 effectively acts as the upper edge 42a of the exhaust port 40a, at a decreasing distance from the cylinder head end 36 as the barrel section 72 is moved from the low port toward the high port position.

At least one end of the barrel section 73 extends exteriorly of the engine block 15 and (FIG. 4) an arm 78 is mounted thereon. The barrel section 73 is rotated between the high and low port positions by suitable means connected to the arm, such as a hand lever or an automatic control described above in connection with the construction illustrated in FIGS. 1 and 2.

FIGS. 7-10 illustrate an alternate construction of a valving arrangement from controlling the timing of the exhaust port opening. This construction is arranged and operates in a manner similar to the embodiment illustrated in FIGS. 3-6, except the rotary barrel section 80 of the valve member is arranged to also vary the effective shape of the exhaust port 40b while the effective distance of the upper edge 42b of the exhaust port 40b from the cylinder head end is being varied. More specifically, the barrel section 80 is larger than the barrel section 73 in the construction illustrated in FIGS. 3-6 and entirely encompasses the exhaust passage 38b. The barrel section 80 has a notched passageway 82 in registry with the exhaust port 40b and includes a transverse edge 86 and side edges 88.

When the barrel section 80 is in the first or high port position (illustrated diagrammatically in FIG. 9 and by solid lines in FIG. 70) the passageway inlet is situated with respect to the exhaust port 40b such that the passageway 82 does not substantially affect the effective distance of the upper edge 42b of the exhaust port 40b from the cylinder head end. When the barrel section 80 is in the second or low port position (illustrated diagrammatically in FIG. 10 and by dashed lines in FIG. 70,) the transverse edge 76 of the passageway inlet is situated inwardly from the upper edge 42b (i.e., below) of the exhaust port 40b and the side walls 88 of the passageway inlet 84 are situated inwardly from the exhaust port sidewalls 90.

Thus, the transverse edge 86 of the passageway inlet effectively acts as a lower upper edge of the exhaust port 40b and cooperates with the side edges 88 to reduce the effective area of the exhaust port 40b at an increasing rate as the barrel section 80 is rotated from the high port position toward the low port position. Such an arrangement is advantageous for some applications because the smaller effective area of the exhaust port opening at low exhaust port conditions prevents over scavenging of the combustion chamber and improved fuel economy.

In the alternate construction illustrated in FIG. 11, a valving arrangement similar to that illustrated in FIGS. 3-6 is employed for controlling the timing of the transfer port opening. More specifically, the barrel section 73a extends transversely of the transfer passage 30a and is mounted in the engine block 15 adjacent the upper edge 34a of the transfer port 32a for rotational movement between a first or high port position (illustrated by solid lines in FIG. 110 and a low port position (illustrated by dashed lines in FIG. 11). When the barrel section 73a is in the high port position, the notch 74a is situated with respect to the transfer port 32a such that the notch edge 76a does not substantially affect the effective distance of the upper edge 34a of the transfer port 32a from the cylinder head end. When the barrel section 73a is in the low port position, a portion of the barrel section extends past the upper edge 34a of the transfer port 32a and the notch edge 76a effectively acts as a lower upper edge of the transfer port 32.

In construction illustrated in FIG. 12, a valving arrangement similar to that illustrated in FIGS. 7-10 is employed for controlling the timing of the opening of a piston-controlled intake port. More specifically, the crankcase 22a is provided with an intake port 100 having upper and lower edges 102 and 104. Fuel-air mixture flows through an intake passage 106 from a carburetor or the like and is introduced into the crankcase 22a in response to a low pressure condition therein as the lower edge 26 of the piston 24 uncovers the lower edge 104 of the intake port 100 during travel toward top dead center. The rotary barrel section 80a of the valve member extends transversely of the intake passage 106 and the passageway 82a is in registry with the intake passage 106 and the intake port 100.

When the barrel section 80a is in the first or low port position (illustrated by solid lines in FIG. 12), the passageway 82a is situated with respect to the intake port 100 such that the passageway 82a and its inlet have substantially no effect on the effective distance of the lower edge 104 of the intake port 100 from the cylinder head end. When the barrel section 80a is in a second or high port position (illustrated by dashed lines in FIG. 12), the passageway inlet is situated with respect to the intake port 100 so as to effectively reduce the distance of the lower edge 104 of the intake port 100 from the cylinder head end and the effective area of the intake port opening is reduced as described above in connection with the construction illustrated in FIGS. 7–10. When early opening of the intake port 100 is desired for higher engine speed power, the barrel section 80a is rotated toward the low port position. When later opening of the intake port 102 is desired for lower engine speeds, the barrel section 80a is rotated toward the high port position.

While the various valving arrangements have been described in connection with one engine port and for controlling the effective distance of one edge of that port, it should be understood that each valving arrangement can be used with any of the ports and arranged to vary the distance of either the upper edge or lower edge of the port from the cylinder head end.

Various of the features of the invention are set forth in the following claims.

I claim:

1. A two-cycle internal combustion engine comprising an engine block including a cylindrical wall defining a cylinder having a head end, a crankcase extending from said cylinder from the end remote from said cylinder head end, a piston having a lower edge and mounted for reciprocative movement in said cylinder relative to said cylinder and to said crankcase so as to cyclically produce in said crankcase a low pressure condition as said piston approaches top dead center and a high pressure condition as said piston approaches bottom dead center, a passage in said engine block comprising a fuel intake passage through which fuel is introduced into said crankcase and terminating at said cylindrical wall in a port having upper and lower edges at given distances from said cylinder head end, said port comprising a fuel intake port having a lower edge located a predetermined maximum distance from said cylinder head end such that, during movement of said piston toward top dead center, said intake port is opened to admit the fuel mixture into said crankcase as the lower edge of said piston passes the lower edge of said intake port and such that, during movement of said piston toward bottom dead center, said intake port is closed as the lower edge of said piston passes the lower edge of said intake port, and valve means mounted in said passage for varying the effective distance of one of the port edges from said cylinder head end, said valve means comprising a valve member including an inner end portion having an edge portion and mounted for radially reciprocative movement relative to said cylindrical wall and to said port between a first position wherein said valve member edge portion is spaced radially outwardly from said wall and does not substantially affect the effective distance of said one port edge from said cylinder head end and a second position wherein said valve member edge portion is located adjacent said wall and said edge portion acts as said one port edge to effectively change the distance thereof from said cylinder head end, said valve member being located relative to said intake port such that, when said valve member is in the second position, said edge portion effectively acts as and raises the lower edge of said intake port to a minimum predetermined distance from said cylinder head end, and means for moving said valve member between the first and second positions.

2. A two-cycle internal combustion engine comprising an engine block including a cylindrical wall defining a cylinder having a head end, a crankcase extending from said cylinder from the end remote from said cylinder head end, a piston mounted for reciprocative movement in said cylinder relative to said cylinder and to said crankcase so as to cyclically produce in said crankcase a low pressure condition as said piston approaches top dead center and a high pressure condition as said piston approaches bottom dead center, a passage in said engine block comprising a transfer passage communicating with said crankcase and terminating at said cylindrical wall in a port having upper and lower edges at given distances from said cylinder head end, said port comprising a transfer port in said cylinder and having an upper edge at a predetermined minimum distance from said cylinder head end such that, during movement of said piston toward bottom dead center, said transfer port is opened as said piston passes the upper edge of said transfer port, and valve means mounted in said passage for varying the effective distance of one of the port edges from said cylinder head end, said valve means comprising a valve member including an inner end portion having an edge portion and mounted for radially reciprocative movement relative to said cylindrical wall and to said port between a first position wherein said valve member edge portion is spaced radially outwardly from said wall and does not substantially affect the effective distance of said one port edge from said cylinder head end and a second position wherein said valve member edge portion is located adjacent said wall and said edge portion acts as said one port edge to effectively change the distance thereof from said cylinder head end, said valve member being located relative to said transfer port such that, when said valve member is in the second position, said edge portion effectively acts as and lowers the upper edge of said transfer port to a maximum predetermined distance from said cylinder head end, and means for moving said valve member between the first and second positions.

3. A two-cycle internal combustion engine comprising an engine block including a cylindrical wall defining a cylinder having a head end, and a crankcase extending from said cylinder from the end remote to said cylinder head end, a piston mounted for reciprocative movement in said cylinder relative to said cylinder head end, said piston having a lower edge and being reciprocative relative to said cylinder and to said crankcase so as to cyclically produce in said crankcase a low pressure condition as said piston approaches top dead center and a high pressure condition as said piston approaches bottom dead center, a passage in said engine block terminating at said cylindrical wall in a fuel intake port having a lower edge located a predetermined maximum distance from said cylinder head end such that, during movement of said piston toward top dead center, said intake port is opened to admit the fuel mixture into said crankcase as the lower edge of said piston passes the lower edge of said intake port and such that, during movement of said piston toward bottom dead center, said intake port is closed as the lower edge of said piston passes the lower edge of said intake port, and a valve member including an elongated barrel section and an axially extending notch located in said barrel section and having an edge and a length substantially coextensive with the width of said port, said valve member being mounted transversely of said passage and adjacent to said port for rotational movement between a first position wherein said notch is located relative to said port so as not to substantially affect the effective distance of said lower edge from said cylinder head end and a second position wherein a portion of said barrel section extends past said lower edge and said notch edge effectively acts as said lower edge and raises the lower edge of said intake port to a minimum predetermined distance from said cylinder head end, and means for rotating said valve member between the first and second positions.

4. A two-cycle internal combustion engine comprising an engine block including a cylindrical wall defining a cylinder having a head end, and a crankcase extending from said cylinder from the end remote to said cylinder head end, a piston mounted for reciprocative movement in said cylinder relative to said cylinder head end, said piston having an upper edge and being reciprocative relative to said cylinder and to said crankcase so as to cyclically produce in said crankcase a low pressure condition as said piston approaches top dead center and a higher pressure condition as said piston approaches bottom dead center, a transfer passage in said engine block communicating with said crankcase and terminating at said cylindrical wall in a transfer port having a lower edge at given distance from said cylinder head end and an upper edge at a predetermined minimum distance from said cylinder head end such that, during movement of said piston toward bottom dead center, said transfer port is opened as the upper edge of said piston passes the upper edge of said transfer port, and a valve member including an elongated barrel section and an axially extending notch located in said barrel section and having an edge and a length substantially coextensive with the width of said port, said valve member being mounted transversely of said passage and adjacent to said port for rotational movement between a first position wherein said notch is located relative to said port so as not to substantially affect the effective distance of said upper edge from said cylinder head end and a second position wherein a portion of said barrel section extends past said upper edge and said notch edge effectively acts as said upper edge and lowers the upper edge of said transfer port to a maximum predetermined distance from said cylinder head end, and means for rotating said valve member between the first and second positions.

* * * * *